H. BREWER.

Improvement in Wagon-Brakes.

No. 132,893.  Patented Nov. 12, 1872.

Witnesses  
Henry Orth  
Wm Colborn Brookes

Inventor  
Harvey Brewer.  
By his Attorney  
T H Opperman

UNITED STATES PATENT OFFICE.

HARVEY BREWER, OF EAST PARSONFIELD, MAINE.

IMPROVEMENT IN WAGON-BRAKES.

Specification forming part of Letters Patent No. 132,893, dated November 12, 1872.

*To all whom it may concern:*

Be it known that I, HARVEY BREWER, of East Parsonfield, in the county of York and State of Maine, have invented certain new and useful Improvements in Wagon-Brakes; and I do hereby declare the following is a full, clear, and exact description of the same, reference being had to the accompanying drawing, in which—

Figure 1:
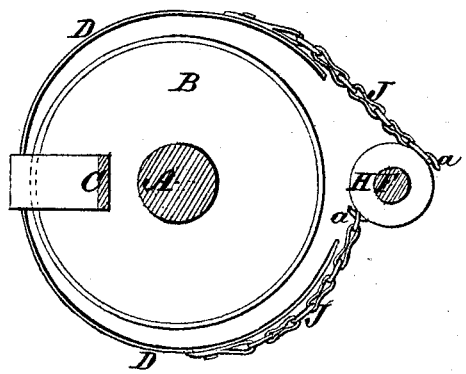
Figure 2:
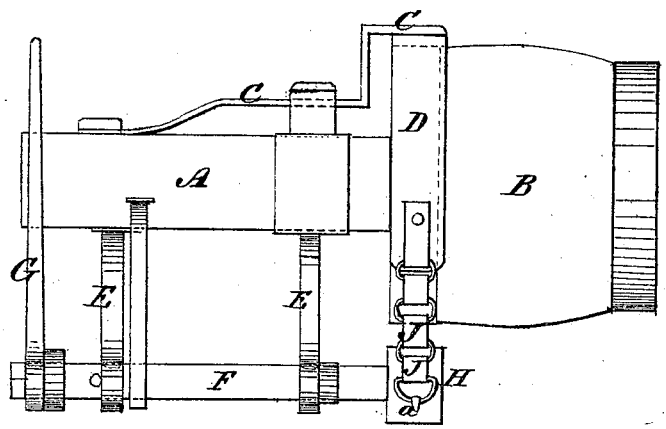

Figure 1 represents a side view of the hub, removed to show the arrangement of the braking device; Fig. 2, a plan or top view of the device arranged for use.

My invention consists in the arrangement of a spring-brake so as to encircle the hub of a wagon, said brake being operated by a tumbler on the end of the lever-shaft, in combination with an elastic supporting-bar, to which the brake is attached, and which yields to the continued pressure on the lever, in the manner and for the purpose hereinafter described.

Referring to the drawing, A represents a section of a carriage-axle, on which the hub B of the wheel is mounted. At the rear of the axle is secured a spring-bar, C, to which is secured the spring braking device D, as clearly shown in Fig. 2 of the drawing. The same view also illustrates the devices by which the brake is operated. Extending through and frontward from the axle-tree are two adjustable arms, E E, which form bearings for a rod, F, on which is secured the operating-lever G, which may be arranged to be grasped by the driver or connected to the harness of the team so as to be self-operating, as may be desired. On the ends of this rod F, and in front of the hub B, is mounted a tumbler, H, provided at diametrically-opposite points with lugs *a*, onto which the flexible chains J, connecting the ends of the spring-brake D with the said tumbler, are placed.

By reference to the drawing it will be seen that by carrying the operating-lever G forward the tumbler H contracts the spring D in opposite directions, carrying that part which is above the hub downward and that part beneath it upward; and that if a combined pressure be exerted on the operating-lever the spring-supporting bar C yields to such pressure until the brake is in direct contact with the hub over nearly its entire periphery, thus exerting a powerful braking force.

Having described my invention, I claim—

The combination of the spring-brake D, constructed as shown and operated by the rod F, having at its ends the tumblers H provided with lugs *a* for the attachment of the flexible chains J, with the spring-supporting bar C, the whole arranged and operating as set forth.

In testimony whereof I have hereunto signed my name.

HARVEY BREWER.

Witnesses:
RUTHVEN J. DEARBIN,
TIMOTHY A. PENDEXTER.